United States Patent Office 3,521,367
Patented July 21, 1970

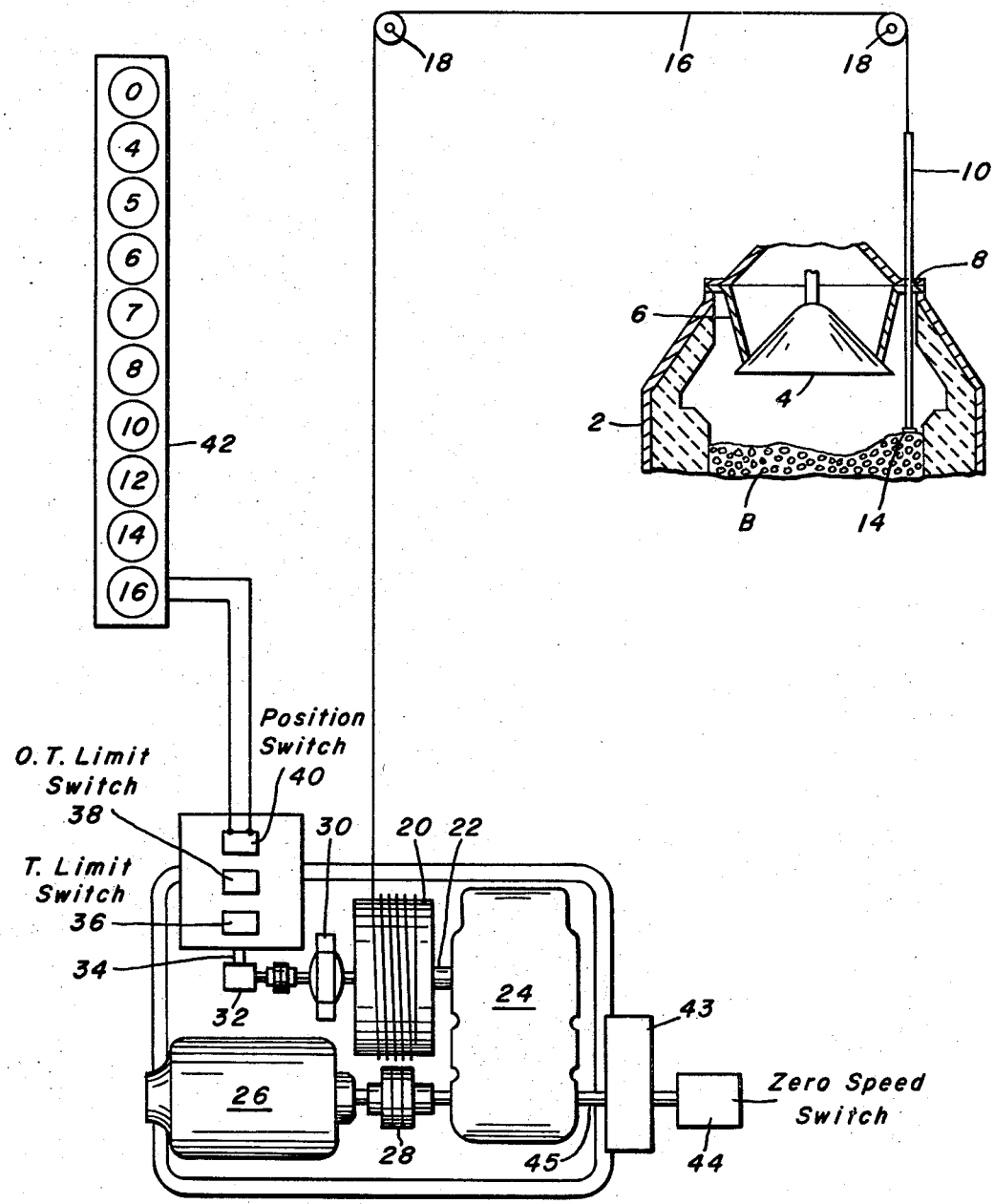

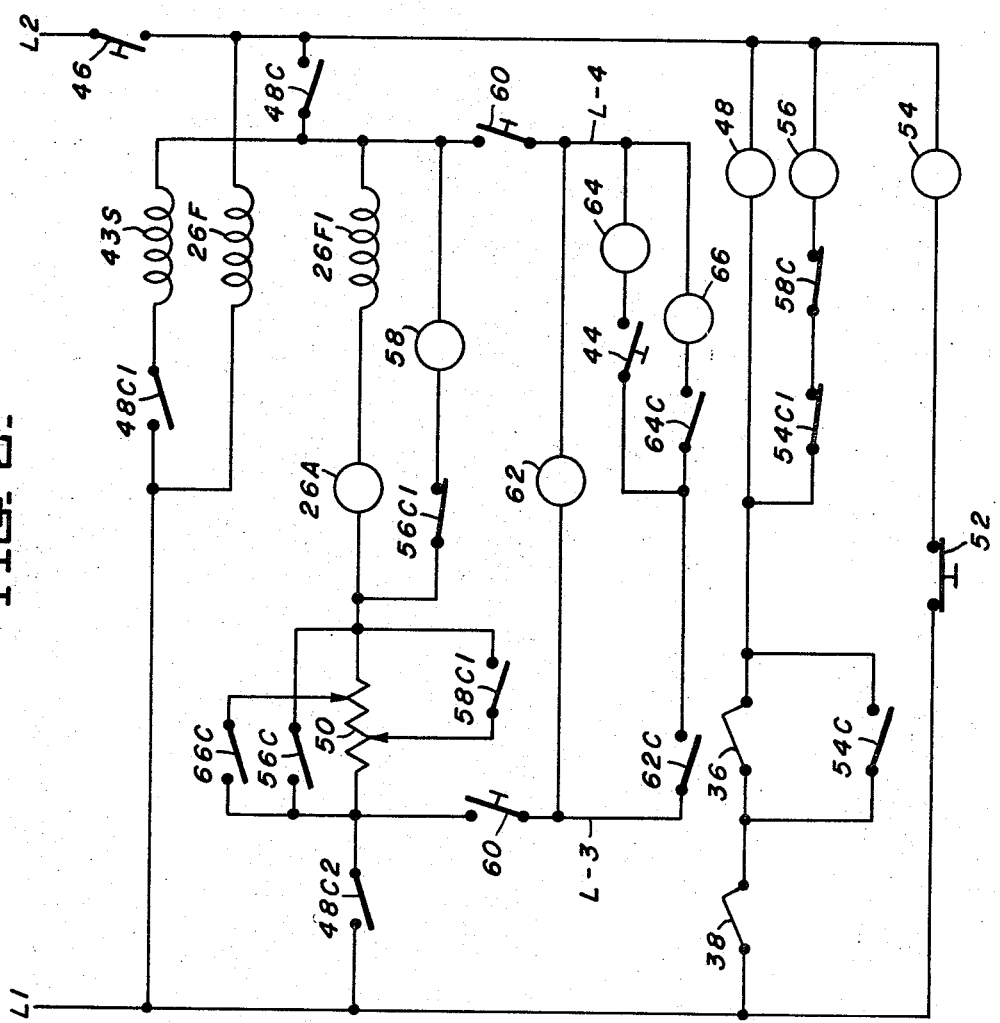

3,521,367
MATERIAL LEVEL INDICATOR
Nick J. Grynovich, Gary, Ind., and Stanley J. Lesniak, Chicago, Ill., assignors to United States Steel Corporation, a corporation of Delaware
Filed Aug. 15, 1968, Ser. No. 752,847
Int. Cl. G01f 23/00
U.S. Cl. 33—126.6
7 Claims

ABSTRACT OF THE DISCLOSURE

Apparatus for indicating the level of a burden in a blast furnace in which a test rod contacts the top of the burden. The test rod is moved upwardly a pre-determined distance each time it contacts the burden and then moves downwardly in a short time. For this purpose a zero-speed switch is connected in series with the contact of a time delay relay which opens and closes at intervals. A relay coil in series with the contact and switch has a contact which is in a by-pass circuit of a resistance in series with the hoist motor armature. The normally opened zero speed switch closes as the rod engages the burden causing the resistance to be varied to allow the motor to raise the test rod.

---

This invention relates to a level indicator and more particularly to a level indicator for a blast furnace. Devices suitable for this purpose are shown in Berg. Pat. No. 1,611,407 dated Dec. 21, 1926; Mohr et al. Pat. No. 2,704,401 dated Mar. 22, 1955; and Janner Pat. No. 2,847,133 dated Aug. 12, 1958. As generally shown in these patents the indication of burden level is accomplished by lowering a steel rod through an opening at the top of a furnace, adjacent and clear of the large distributor bell and hopper, and into the furnace by means of a winch-operated cable, the weight of the rod unwinding the winch drum or, as shown in the Mohr patent, the rod being raised by a counter-weight and lowered by the drum motor. The level of the rod in the furnace is measured by the footage of cable unwound from the cable drum and a position switch thereon indicates on a stockline recording meter the level at which the rod comes to rest. The position switch also causes a lamp to light which lamp is one of a series of lamps set in per-foot increments that individually light up for each of the differing per-foot levels of the rod positions. For most efficient operation of a furnace, the burden must be maintained at a proper elevation within the furnace, and the stock must constantly be fed into the furnace to make up for the lowering of the burden caused by the melting-down process. The old methods allow the rod to periodically rest on the burden and, because of the high temperatures and the weight of the rod, this causes the rod to bend. This condition is aggravated at each resting so that the rod will bow into almost a semi-circle which will no longer allow the rod to be withdrawn, and the rod must then be disconnected and allowed to drop into the furnace. The apparatus of the Berg patent periodically raises and lowers the test rod, but not at close intervals. In addition, it raises the rod each time to the fully retracted position which takes considerable time and power. Also, it is necessary to run the motor in one direction to raise the rod and in the reverse direction to lower it. Frequent reversal is of course hard on the motor. Since the rod rests on the burden for a considerable time it is subject to the bending mentioned above.

It is therefore an object of our invention to provide a level indicator using a test rod in which the rod is reciprocated at short time intervals to prevent it from bending.

Another object is to provide such an indicator for use in a blast furnace in which the rod rests on the burden for only a short time before it is raised.

Still another object is to provide such an indicator in which the winch motor is not reversed to raise and lower the rod.

A still further object is to provide such an indicator in which the rod is wiped by its frequent movement through its guide.

These and other objects will be more apparent after referring to the following specification and attached drawing, in which:

FIG. 1 is a schematic view of a blast furnace equipped with the apparatus of our invention;

FIG. 2 is a schematic wiring diagram of the control of our invention; and

FIG. 3 is a view showing the relay coils of FIG. 2 associated with their contacts.

Referring more particularly to the drawings, reference numeral 2 indicates a blast furnace top having a burden B therein. A large bell 4 is mounted in the furnace top and cooperates with a large bell hopper 6 to feed the burden materials to the furnace. A guide 8 is provided in the furnace top 2 for slidably receiving a test rod 10 having a foot 14 at its lower end which is adapted to contact and rest on the top of the burden B. A cable 16 is attached to the top of the rod 10 and passes over sheaves 18 to a rotatable drum 20. The drum 20 has a shaft 22 connected to a speed reducer 24 which is driven by an electric motor 26 through coupling 28. Drum shaft 22 is supported in a bearing 30 and extends therefrom to a speed reducer 32 having an output shaft 34 which in connected to a hoist travel limit switch 36, an over travel limit switch 38 and a position switch 40. A lamp target 42 is connected for operation by the position switch 40. The limit switch 36 is closed at all times, except when the test rod reaches its upper limit of travel. The over travel limit switch is closed during all normal operation and opens only if the limit switch 36 fails to open and the rod 10 continues to move upwardly. The lamp target 42 operates to indicate the level of the burden B in the furnace. A brake 43 is connected to the speed reducer 24 and is operable by a solenoid 43S. Energization of the solenoid 43S releases the brake while deenergization causes the brake to set. The parts so far described are conventional and are essentially the same as shown and described in the above mentioned patents.

According to our invention a zero speed switch 44 is connected to shaft 45 of the speed reducer 24 and this switch is open at all times, except at zero speed of the drum 20 which occurs when the rod 10 comes to rest on the burden. The switch 44 is preferably a Type C or F shown in Bulletin 2220 of the Euclid Electric and Manufacturing Company of Madison, Ohio.

The motor 26 has an armature 26A, a shunt field 26F and a series field 26F1 as shown in FIG. 2. Power for the motor and its control circuit is provided by a 230 volt D.C. source L1, L2 having a safety switch 46 therein. Switches 36 and 38 are connected in series with a main contactor relay coil 48 to power source L1, L2. The relay coil 48 has three normally open contacts 48C, 48C1 and 48C2, that is, the contacts are open when the coil 48 is deenergized. Contact 48C is connected in series with series field 26F1, armature 26A, resistance 50 and contact and contact 48C2. Shunt field 26F is directly connected to power source L1, L2 and is energized as long as switch 46 is closed. Brake solenoid 43S is connected to power source L1, L2 in series with contacts 48C and 48C1. A manual switch 52 is connected in series with an interlocking relay coil 54 having a normally open contact 54C in parallel with switch 36 and a normally closed contact 54C1 which is in series with hoisting relay coil 56. Relay coil 56 has a normally open contact 56C which is mounted in parallel with resistor 50 and a normally closed contact 56C1 which is connected in series with lowering speed relay coil 58. Contact 56C1 and coil 58 are connected in parallel with armature 26A and series field 26F1. Relay coil 58 has a normally closed contact 58C which is connected in series with contact 54C1 and coil 56 and a normally open contact 58C1 which is connected to by-pass part of resistor 50. The parts of the circuit so far described are conventional.

According to our invention we provide a switch 60 which is connected to power source L1, L2 through contacts 48C and 48C2 so as to provide current to lines L3 and L4. A time delay relay coil 62 having a normally open contact 62C is connected across lines L3 and L4. Contact 62C is connected in series with zero speed switch 44 and time delay relay coil 64 which has a normally open contact 64C connected in parallel with switch 44 and coil 64 and in series with relay coil 66 which has a normally open contact 66C connected to by-pass part of resistance 50.

In operation, the test rod 10 is installed in the furnace in its fully retracted position above the lower part of hopper 6 so that it cannot be struck by falling burden and the over travel limit switch 38 is closed, but will open on additional raising of the rod 10. The hoist travel limit switch 36 is open, but will close below this level. The switches 46 and 52 are closed and switch 60 open. Closing of switch 46 energizes shunt field 26F and coil 54 so as to close contact 54C and open contact 54C1. Closing of contact 54C energizes coil 48, thus closing normally open contacts 48C, 48C1 and 48C2. This energizes solenoid 43S to release brake 43 and also energizes armature 26A and series field 26F1. Motor 26 is wired for a hoisting, but resistance 50 is in series with armature 26A and decreases the torque to a value where the weight of rod 10 overcomes the hoisting torque and permits the rod 10 to lower into the furnace. Motor armature 26A is pre-set to a maximum lowering speed which, if exceeded, energizes coil 58 by the counter E.M.F. of the motor. Energization of coil 58 opens contact 58C to prevent plugging of the motor and closes contact 58C1 to by-pass part of resistor 50 so as to increase the motor torque and decrease the lowering speed of rod 10. When rod 10 rests on the burden B, the level of the burden is indicated by lamp target 42 through the position switch 40.

The switch 52 is opened to raise the rod 10 by deenergizing coil 54 so as to open contact 54C and close contact 54C1. Closing contact 54C1 energizes coil 56 through switches 36 and 38. Energization of coil 56 closes contact 56C to by-pass all of resistance 50 so as to give motor 26 its full-rated torque to hoist rod 10 to its fully retracted position, at which time switch 36 will open and deenergize coils 48 and 56 so as to deenergize armature 26A, field 26F1 and solenoid 43S to set the brake 43. If switch 36 does not open, further travel of the rod 10 will cause switch 38 to open to deenergize coils 48 and 56. The operation so far described is conventional.

To practice our invention, switch 60 is closed to energize coil 62 which, after a pre-set time interval (preferably about 5 to 10 seconds), will close its contact 62C, which will remain closed as long as contacts 48C and 48C2 and switches 46 and 60 are closed. The time delay of relay 62 is sufficient to insure proper sequencing of relays regardless of position or movement of rod 10 when switch 60 is closed. This is a control feature which could be omitted if desired. When the rod 10 comes to rest on the burden B it closes zero-speed switch 44. Closing of switch 44 and contact 62C will energize time delay relay coil 64 to close its contact 64C to energize coil 66 and closing its contact 66C to by-pass a sufficient part of resistance 50 to give motor 26 sufficient torque to retract rod 10 a pre-set distance which may be about 18 inches. The contact 64C remains closed for a pre-set time interval which determines the amount of travel of rod 10 and then opens. Switch 44 opens as soon as the rod 10 leaves the burden B to deenergize coil 64 and will remain open until the rod 10 again contacts the burden because it has sufficient momentum to remain open during the reversal in direction of travel of the rod 10 at its upper position. Thus, opening of contact 64C deenergizes coil 66 so as to reinsert all of resistance 50 after rod 10 rises the pre-set distance. This decreases the motor torque and allows the weight of the rod 10 to lower it until it again contacts burden B. The operation is then repeated. Of course, if a counter-balance were used, as in the above identified Mohr et al. patent, the maximum resistance would be inserted to cause movement of the rod and the minimum resistance to prevent movement.

While one embodiment of our invention has been shown and described, it will be apparent that other adaptations and modifications may be made without departing from the scope of the following claims.

We claim:

1. In apparatus for indicating the level of material subject to elevated temperatures including a generally vertical test rod adapted to contact the top of said material, a flexible member connected to said rod, a rotatable drum for winding said flexible member, a uni-directional motor mechanically connected to said drum, said motor having an armature and a variable resistance connected in series to a D.C. power source, said resistance varying the torque applied by said motor to raise said rod at high torque and permit the rod to lower at low torque; the improvement comprising a zero speed switch connected to be open when said rod is moving and closed when it is stopped by contact with said burden, and means operable by closing of said zero speed switch to set said variable resistance to a value which permits said rod to raise a pre-determined distance.

2. Apparatus according to claim 1 in which said operable means includes a time delay relay coil in series with said zero speed switch, and a normally open contact operable by said time delay relay coil and adapted to remain closed for a pre-set time to set said variable resistance to a value which permits said rod to raise a pre-determined distance.

3. Apparatus according to claim 2 in which said resistance is of such value that the torque of said motor is insufficient to raise said rod when all of said resistance is in series therewith; and said operable means includes a relay coil in series with said contact, and a contact operable by said relay coil in a circuit to by-pass sufficient of said resistance to permit said motor to raise said rod to a pre-determined distance.

4. Apparatus according to claim 1 in which said zero speed switch is connected to be driven at a speed proportional to the speed of said drum.

5. Apparauts according to claim 4 in which said operable means includes a time delay relay coil in series with said zero speed switch, and a normally open contact operable by said time delay relay coil and adapted to remain closed for a pre-set time to set said variable resistance to a value which permits said rod to raise a pre-determined distance.

6. Apparatus according to claim 5 in which said resistance is of such value that the torque of said motor is insufficient to raise said rod when all of said resistance is in series therewith; and said operable mean includes a relay coil in series with said contact, and a contact operable by said relay coil in a circuit to by-pass sufficient of said resistance to permit said motor to raise said rod a pre-determined distance.

7. Apparatus according to claim 6 in which said material is the burden in a blast furnace.

References Cited

UNITED STATES PATENTS

| | | | |
|---|---|---|---|
| 1,265,328 | 5/1918 | Henderson | 318—159 X |
| 2,704,401 | 3/1955 | Mohr et al. | 33—126.6 |
| 2,708,256 | 5/1955 | Colt | 318—159 X |
| 2,954,224 | 9/1960 | Scheider et al. | 318—462 X |
| 3,253,205 | 5/1966 | Hull | 318—462 X |
| 3,400,462 | 9/1968 | Pobst | 33—126.6 |

OTHER REFERENCES

Publication: "Type F Low-Speed Fluid Switches," Euclid Electric & Mfg. Co. Bulletin 2220 September, 1959. Copy in 200–61.04.

S. CLEMENT SWISHER, Primary Examiner

D. M. YASICH, Assistant Examiner

U.S. Cl. X.R.

73—321